US008838759B1

(12) United States Patent  
Eatough et al.

(10) Patent No.: US 8,838,759 B1
(45) Date of Patent: Sep. 16, 2014

(54) SYSTEMS AND METHODS FOR DETECTING UNMANAGED NODES WITHIN A SYSTEM

(75) Inventors: David A. Eatough, Herriman, UT (US); Peter E. Johnson, Lehi, UT (US); David B. Morley, Highland, UT (US)

(73) Assignee: Crimson Corporation, Dover, DE (US)

( * ) Notice: Subject to any disclaimer, the term of this patent is extended or adjusted under 35 U.S.C. 154(b) by 1245 days.

(21) Appl. No.: 11/771,735

(22) Filed: Jun. 29, 2007

(51) Int. Cl.
G06F 15/173 (2006.01)

(52) U.S. Cl.
USPC .......................................... 709/223

(58) Field of Classification Search
USPC .......................................... 709/223
See application file for complete search history.

(56) References Cited

U.S. PATENT DOCUMENTS

| 5,710,885 | A  * | 1/1998  | Bondi ........................... 709/224 |
| 6,021,429 | A  * | 2/2000  | Danknick ........................ 709/208 |
| 6,442,144 | B1 * | 8/2002  | Hansen et al. .................. 370/255 |
| 6,496,859 | B2 * | 12/2002 | Roy et al. ....................... 709/223 |
| 6,829,641 | B2 * | 12/2004 | Schenkel et al. ............... 709/224 |
| 6,982,953 | B1 * | 1/2006  | Swales .......................... 370/218 |
| 7,020,694 | B2   | 3/2006  | Saito et al. |
| 7,031,288 | B2 * | 4/2006  | Ogier ............................ 370/338 |
| 7,082,117 | B2   | 7/2006  | Billhartz |
| 7,152,179 | B1   | 12/2006 | Critchfield |
| 7,307,962 | B2   | 12/2007 | Pulsipher |
| 7,539,150 | B2 * | 5/2009  | Lauer et al. .................... 370/254 |
| 2002/0132617 | A1 * | 9/2002  | Nuss et al. .................... 455/422 |
| 2002/0166002 | A1 * | 11/2002 | Milner et al. ..................... 710/8 |
| 2003/0014548 | A1 * | 1/2003  | Valentine et al. .............. 709/252 |
| 2003/0163583 | A1 * | 8/2003  | Tarr .............................. 709/245 |
| 2004/0203435 | A1 * | 10/2004 | Karlquist et al. ........... 455/67.11 |
| 2004/0243703 | A1 * | 12/2004 | Demmer et al. .............. 709/224 |
| 2004/0267876 | A1 * | 12/2004 | Kakivaya et al. ............. 709/200 |
| 2006/0083252 | A1 * | 4/2006  | Sakuraba et al. ............. 370/400 |
| 2007/0005738 | A1 * | 1/2007  | Alexion-Tiernan et al. .. 709/223 |

* cited by examiner

Primary Examiner — Larry Donaghue
(74) Attorney, Agent, or Firm — Austin Rapp & Hardman

(57) ABSTRACT

A method for detecting unmanaged nodes within a system is described. A flow of data associated with a node is detected, wherein a managed node detects the flow of data. Information relating to the node is discovered. A determination is made whether the node has been previously discovered. The identification of the node is recorded to a list if it is determined the node has not been previously discovered. The identification of the node is transmitted to a management device.

18 Claims, 8 Drawing Sheets

SYSTEMS AND METHODS FOR DETECTING UNMANAGED NODES WITHIN A SYSTEM

TECHNICAL FIELD

The present invention relates generally to computers and computer-related technology. More specifically, the present invention relates to systems and methods for detecting unmanaged nodes within a system.

BACKGROUND

Computer and communication technologies continue to advance at a rapid pace. Indeed, computer and communication technologies are involved in many aspects of a person's day. Computers commonly used include everything from hand-held computing devices to large multi-processor computer systems.

Computers are used in almost all aspects of business, industry and academic endeavors. More and more homes are using computers as well. The pervasiveness of computers has been accelerated by the increased use of computer networks, including the Internet. These computers are often interconnected to form a computer network. As is often the case, a single server or core server is responsible for managing other computers. The managed computers are often referred to as nodes. A computer network may have hundreds or even thousands of managed nodes.

Most companies have one or more computer networks and also make extensive use of the Internet. The productivity of employees often requires human and computer interaction. Improvements in computers and software have been a force for bringing about great increases in business and industrial productivity.

Maintaining and supporting computer systems is important to anyone who relies on computers. Whether a computer or computing device is in a home or at a business, at least some maintenance and/or support is often needed. For example, sometimes there are problems with computer hardware. In addition, computer hardware is often upgraded and replaced with new components. Similarly, computer software is also frequently upgraded or replaced. New computer hardware and software is continually being integrated into systems across the world.

As corporate performance and end-user productivity have become increasingly dependent on computers, computer support personnel are continuously under pressure to accomplish more with existing or reduced staff head counts. They are also under pressure to perform tasks as efficiently as possible which may include minimizing effects to existing computer systems and networks.

As shown from the above discussion, there is a need for systems and methods that will improve the ability to manage and support computer systems. Improved systems and methods may enable a person performing computer support to work more efficiently and accomplish more in less time. Benefits may be realized by providing increased functionality to assist in computer maintenance and support.

BRIEF DESCRIPTION OF THE DRAWINGS

Exemplary embodiments of the invention will become more fully apparent from the following description and appended claims, taken in conjunction with the accompanying drawings. Understanding that these drawings depict only exemplary embodiments and are, therefore, not to be considered limiting of the invention's scope, the exemplary embodiments of the invention will be described with additional specificity and detail through use of the accompanying drawings in which:

DETAILED DESCRIPTION

Figure 1:
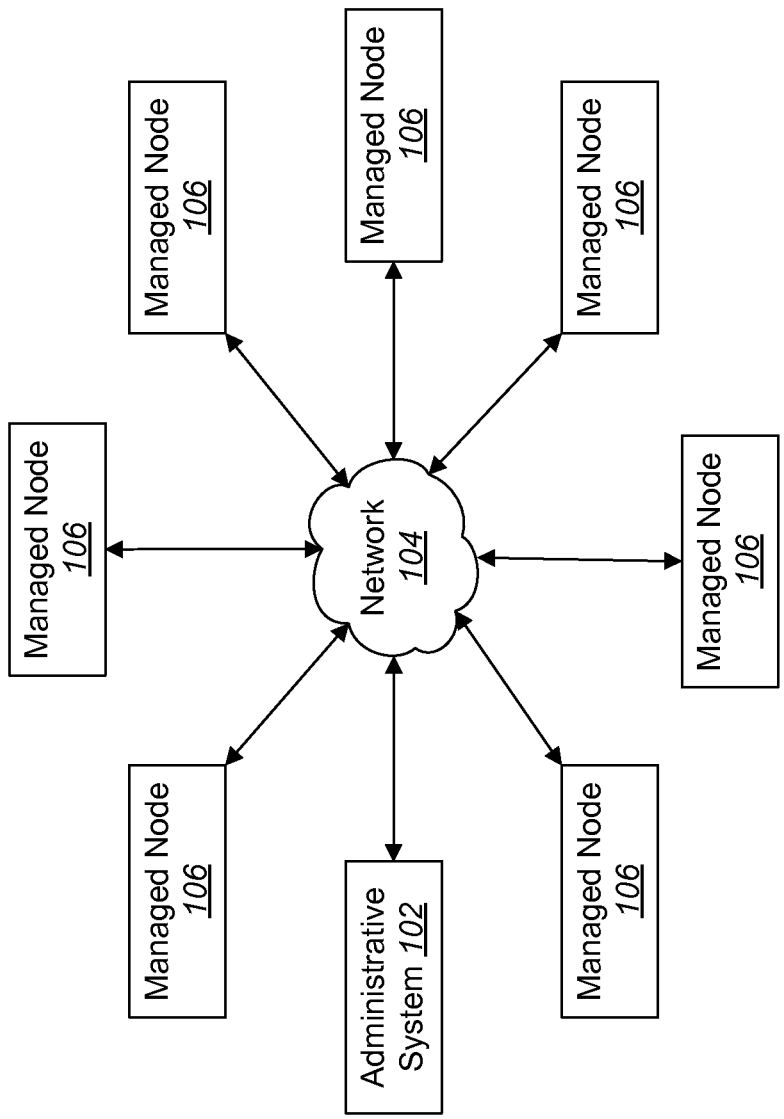
FIG. 1 illustrates an exemplary environment in which embodiments may be practiced, which includes an administrative system and a plurality of managed nodes.

A method for detecting unmanaged nodes within a system is described. A flow of data associated with a node is detected, wherein a managed node detects the flow of data. Information relating to the node is discovered. A determination is made whether the node has been previously discovered. The identification of the node is recorded to a list if it is determined the node has not been previously discovered. The identification of the node is transmitted to a management device.

In one embodiment, the flow of data is a Dynamic Host Configuration Protocol (DHCP) broadcast. In a further embodiment, the flow of data is an Address Resolution Protocol (ARP) request. A filename associated with a Media Access Control (MAC) address of the node may be built. A determination is made whether a file associated with the filename is stored in local cache of the node. A peer aware download is performed and a determination is made whether the file is included in a local subnet of the node.

A core device may be contacted to download the file if it is determined that the file is not included in the local subnet of the node. In one embodiment, the core device identifies an undiscovered machine based on a Uniform Resource Locator (URL) of the file that is downloaded from the core device. A determination is made whether a management agent included on the node is disabled. Information related with the node may be compared with information stored in a database. The node may be flagged as an unmanaged node if information relating to the node is not stored in a database. In one embodiment, the information relating to the node may be a hostname, an Internet Protocol (IP) address, a MAC address and a status of a management agent.

A computer system that is configured to detect unmanaged nodes within a system is also described. The computer system includes a processor and memory in electronic communication with the processor. Instructions are stored in the memory. A flow of data associated with a node is detected, wherein the computer system detects the flow of data. Information relating to the node is discovered. A determination is made whether the node has been previously discovered. The identification of the node is recorded to a list if it is determined the node has not been previously discovered. The identification of the node is transmitted to a management device.

A computer-readable medium comprising executable instructions for detecting unmanaged nodes within a system is also described. A flow of data associated with a node is detected, wherein a managed node detects the flow of data. Information relating to the node is discovered. A determination is made whether the node has been previously discovered. The identification of the node is recorded to a list if it is determined the node has not been previously discovered. The identification of the node is transmitted to a management device.

Various embodiments of the invention are now described with reference to the Figures, where like reference numbers indicate identical or functionally similar elements. The embodiments of the present invention, as generally described and illustrated in the Figures herein, could be arranged and designed in a wide variety of different configurations. Thus, the following more detailed description of several exemplary embodiments of the present invention, as represented in the Figures, is not intended to limit the scope of the invention, as claimed, but is merely representative of the embodiments of the invention.

The word "exemplary" is used exclusively herein to mean "serving as an example, instance, or illustration." Any embodiment described herein as "exemplary" is not necessarily to be construed as preferred or advantageous over other embodiments.

Many features of the embodiments disclosed herein may be implemented as computer software, electronic hardware, or combinations of both. To clearly illustrate this interchangeability of hardware and software, various components will be described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Where the described functionality is implemented as computer software, such software may include any type of computer instruction or computer executable code located within a memory device and/or transmitted as electronic signals over a system bus or network. Software that implements the functionality associated with components described herein may comprise a single instruction, or many instructions, and may be distributed over several different code segments, among different programs, and across several memory devices.

As used herein, the terms "an embodiment", "embodiment", "embodiments", "the embodiment", "the embodiments", "one or more embodiments", "some embodiments", "certain embodiments", "one embodiment", "another embodiment" and the like mean one or more (but not necessarily all) embodiments of the disclosed invention(s)", unless expressly specified otherwise.

The term "determining" (and grammatical variants thereof) is used in an extremely broad sense. The term "determining" encompasses a wide variety of actions and therefore "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

Many of the devices within a typical Information Technology (IT) department are not managed. In other words, many devices may be unknown to the IT department. For example, departments and individuals may introduce devices that are independent of the IT department. In many cases, the number of devices introduced independent of the IT department may be as much as several times greater than the number of machines managed by the IT department. Discovering devices that are introduced independent of the IT department has several advantages. For example, foreign devices that may be a security risk are identified. In addition, the number of devices the IT department may prevent from causing problems increases because each unmanaged device is a risk for spreading viruses and hosting unlicensed software. Further, revenue for a licensor may increase if the revenue depends on the number of devices managed by the IT department.

Existing functionality in software helps to identify unmanaged devices by executing a ping sweep of the network. This functionality is effective if a ping reaches all the devices in an organization. However, routers often block pings, and some devices may not be powered on at the time of the ping sweep. Various alternate solutions may require a modification to the infrastructure of an organization's network. For example, one such modification may be a manual or automated system of retrieving Dynamic Host Configuration Protocol (DHCP) logs from a DHCP server. These logs may be compared to the Internet Protocol (IP) or Media Access Control (MAC) address of managed devices. Another modification may include dedicating (even on a temporary basis) hardware in various locations throughout the network to listen for network traffic from unmanaged devices. However, these alternate solutions possess a significant limitation in that modifications to an existing IT infrastructure are difficult or impossible (politically and/or financially).

An additional challenge for an IT department is determining whether or not a management agent is functional on a device. Many organizations allow end users administrative access to their devices (such as computers) which give the end users the ability to completely control the operating system running on the device. Users with administrative rights may disable management agents that are running on their devices. This may cause management issues for the IT department.

A further challenge for the IT department is determining what assets exist in an organization. While Domain Name System (DNS) and DHCP mechanisms may be effective to find devices that have dynamic address locations, static device may be problematic. One approach to alleviating this challenge is to listen for Address Resolution Protocol (ARP) requests coming from other devices in the network. This makes it possible to associate a MAC address with an IP address and possibly a host name. This information may then be coordinated by a core server to determine which devices have been previously discovered. However, simply discovering devices via an ARP request is an inefficient use of network resources.

FIG. 1 illustrates an exemplary environment in which embodiments may be practiced. An administrative computer system 102 is connected to a computer network 104. The administrative system 102 may be used to manage other computer systems that are also connected to the computer network 104. These other computer systems will be referred to herein as managed nodes 106 or managed devices. The managed nodes 106 may be personal computers, servers, printing devices, personal digital assistants (PDAs), cellular telephones, and so forth. The network 104 may include various components (such as routers, gateways, hubs, etc.) which allow the administrative system 102 and the managed nodes 106 to communicate via wired and/or wireless media.

Figure 2:
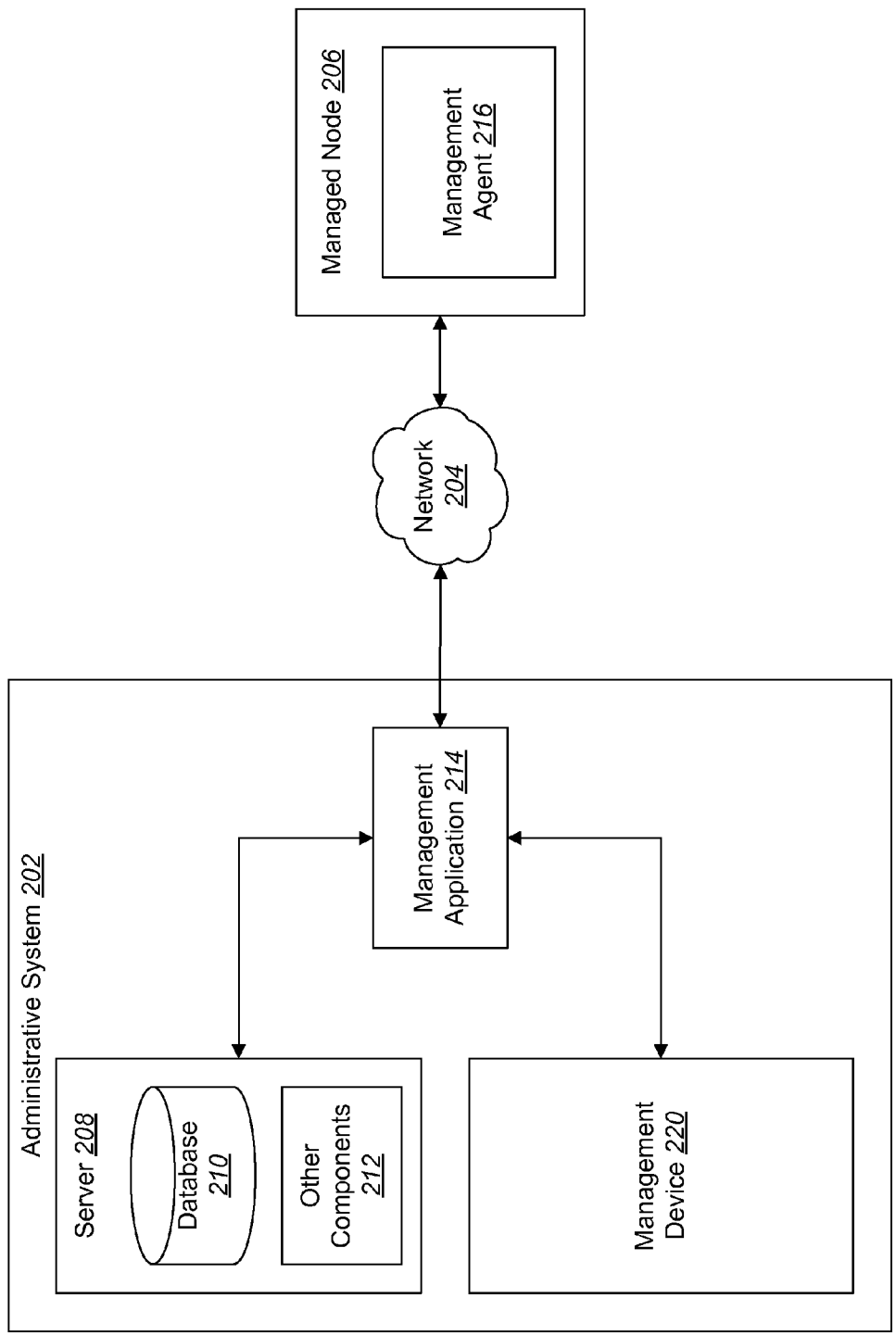
FIG. 2 illustrates various in-band management tools that facilitate remote management of a managed node by an administrative system.

FIG. 2 illustrates various management tools that facilitate remote management of a managed node 206 by an administrative system 202. The administrative system 202 may be part of an IT department and may include a management server 208. The management server 208 may include a database 210 of information. The database 210 may include information about the managed node 206 and also about other managed nodes (not shown) that are connected to a computer network 204 and that the administrative system 202 is responsible for managing. The management server 208 may also include various other components 212 that are configured to perform tasks such as scheduling, handling alerts, and so forth. The management server 208 may be referred to as a core server.

The administrative system 202 may also include a management application 214. The management application 214 may be used to perform various tasks related to the management of the managed node 206 and other managed nodes that are connected to the computer network 204. There are many different kinds of remote management operations that a system administrator may want to perform on the managed node 206. Some examples of remote management operations that may be performed include problem resolution, remote control, software distribution, software license monitoring, operating system imaging and migration, IT asset management, and so forth. As part of performing these tasks, the management application 214 may connect to the management server 208 and query the management server 208 for information. A management device 220 may also be used to manage the managed node 206. The management device 220 may be a computing device and include a desktop computer, laptop computer, personal digital assistant (PDA) device, etc. The management application 214 may also query the management device 220 for commands relating to the management of the managed node 206.

The managed node 206 may include a management agent 216. The management agent 216 performs management-related tasks in response to requests from the management application 214.

In order to remotely perform a management operation on the managed node 206, a system administrator may input instructions to the management application 214 regarding the desired management operation. The instructions may be inputted to the management application 214 via the management device 220. Upon receiving the user's instructions, the management application 214 may send one or more management commands to the management agent 216 on the managed node 206. Upon receiving and processing the management command(s), the management agent 216 may perform the desired management operation. The management agent 216 may send a report back to the management application 214 regarding whether the management operation was successfully performed.

The components that are shown in FIG. 2 are examples of components used to manage a node or device. However, as previously explained, nodes may be introduced independently of the IT department and may thus be unmanaged nodes. In addition, the management agent 216 may become disabled and unable to execute management commands received from the administrative system 202. As such, systems and methods may be implemented to detect unmanaged nodes with disabled management agents 216.

Figure 3:
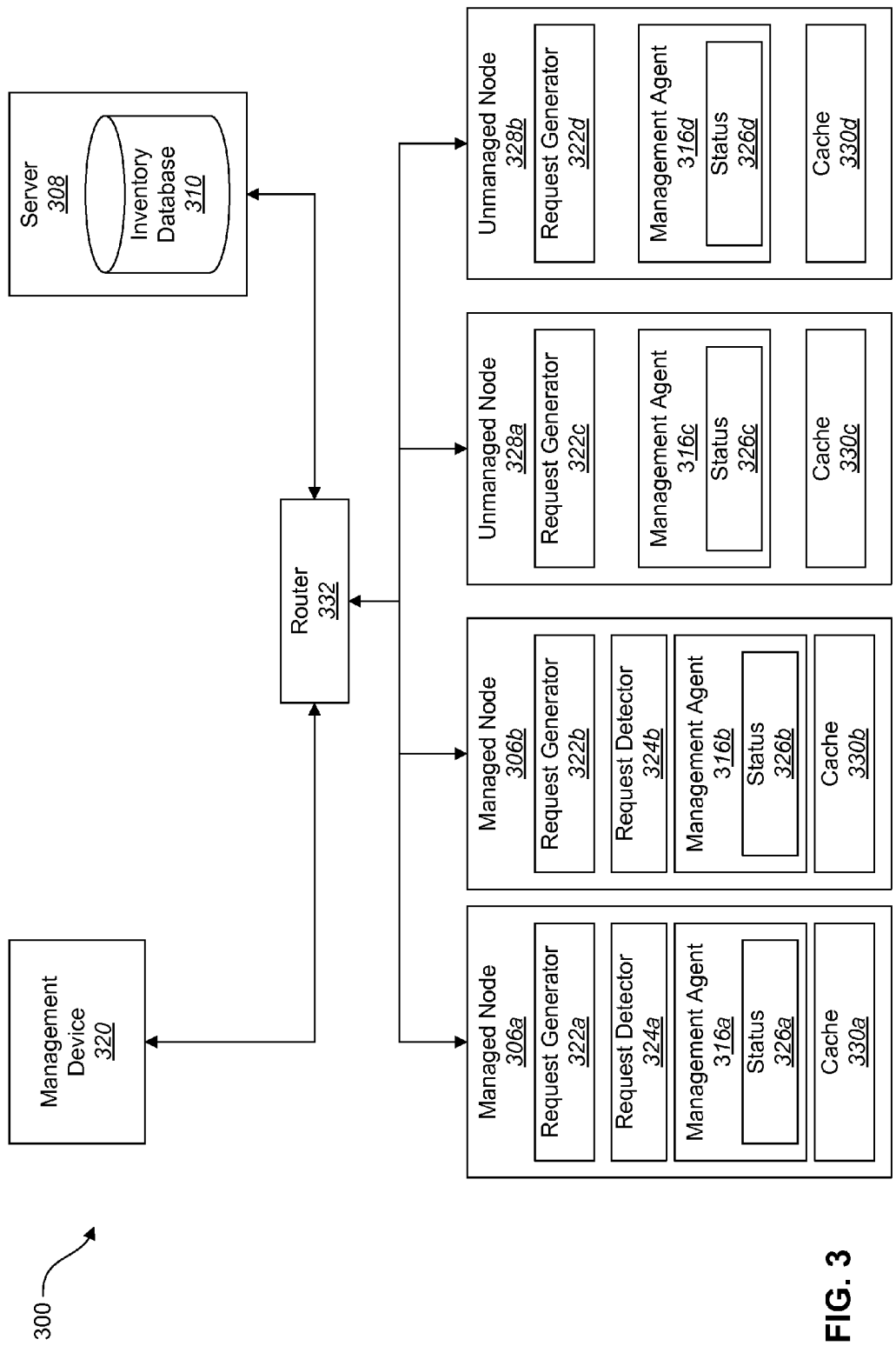
FIG. 3 is a block diagram illustrating one embodiment of components implemented to detect an unmanaged node within a system.

FIG. 3 is a block diagram 300 illustrating one embodiment of components implemented to detect an unmanaged node within a system. A server 308 may include an inventory database 310. The server 308 may be a DHCP server and the database 310 may include a list of nodes (or devices) managed by a management device 320. Communications between managed nodes 306*a*, 306*b*, unmanaged nodes 328*a*, 328*b*, the management device 320 and the server 308 may be passed through a router 332. While only two managed nodes 306*a*, 306*b* and two unmanaged nodes 328*a*, 328*b* are illustrated, it is to be understood that any number of managed nodes and unmanaged nodes may exist in a network system.

In one embodiment, the managed nodes 306*a*, 306*b* and the unmanaged nodes 328*a*, 328*b* broadcast requests to the server 308. The requests may be generated by a request generator 322. The broadcasts may be DHCP broadcasts. The router 332 may convert the DHCP broadcasts from both the managed nodes 306*a*, 306*b* and the unmanaged nodes 328*a*, 328*b*. The router 332 may further send the DHCP broadcasts directly to the server 308. In one embodiment, the management device 320 cannot send pings though the router 332. In addition, the management device 320 may not detect the traffic (such as the DHCP broadcasts) sent from the managed nodes 306*a*, 306*b* and the unmanaged nodes 328*a*, 328*b*.

In one embodiment, the managed nodes 306*a*, 306*b* detect DHCP broadcasts of both managed and unmanaged nodes 328*a*, 328*b*. The managed nodes 306*a*, 306*b* may detect the broadcasts because the router 332 does not filter communications between managed and unmanaged nodes. In one embodiment, the managed nodes 306*a*, 306*b* are scattered throughout a network system. A request detector 324 may detect DHCP broadcasts relating to the unmanaged nodes 328*a*, 328*b*. The request detector 324 may detect DHCP broadcasts that are requests or replies. The managed node 306 may record each node that is associated with a DHCP broadcast. In one embodiment, the managed node 306 records unique nodes associated with the DHCP broadcast. In other words, the managed node 306 records information about a node when a DHCP broadcast is detected if information about the node has not been previously recorded by the managed node 306. The managed node 306 may store a list of the unique nodes in cache 330. The managed node 306 may transmit the list of the unique nodes to the management device 320 through the router 332. The management device 320 may compare the list of the unique nodes to the list of managed nodes included in the inventory database 310. If a unique node is not included within the database 310, the management device 320 may mark the unique node as an unmanaged device 328.

The managed nodes 306 and the unmanaged nodes 328 also include a management agent 316 as previously explained. The management agent 316 includes a status indicator 326. The status indicator 326 indicates whether the management agent 316 is functioning or disabled. The managed node 306 may send a list of nodes with disabled management agents 326 to the management device 320. The list may be compared with the list of managed nodes included in the inventory database 310. If the node with the disabled agent is not included in the database 310, the node is marked as an unmanaged node 328.

Figure 4:
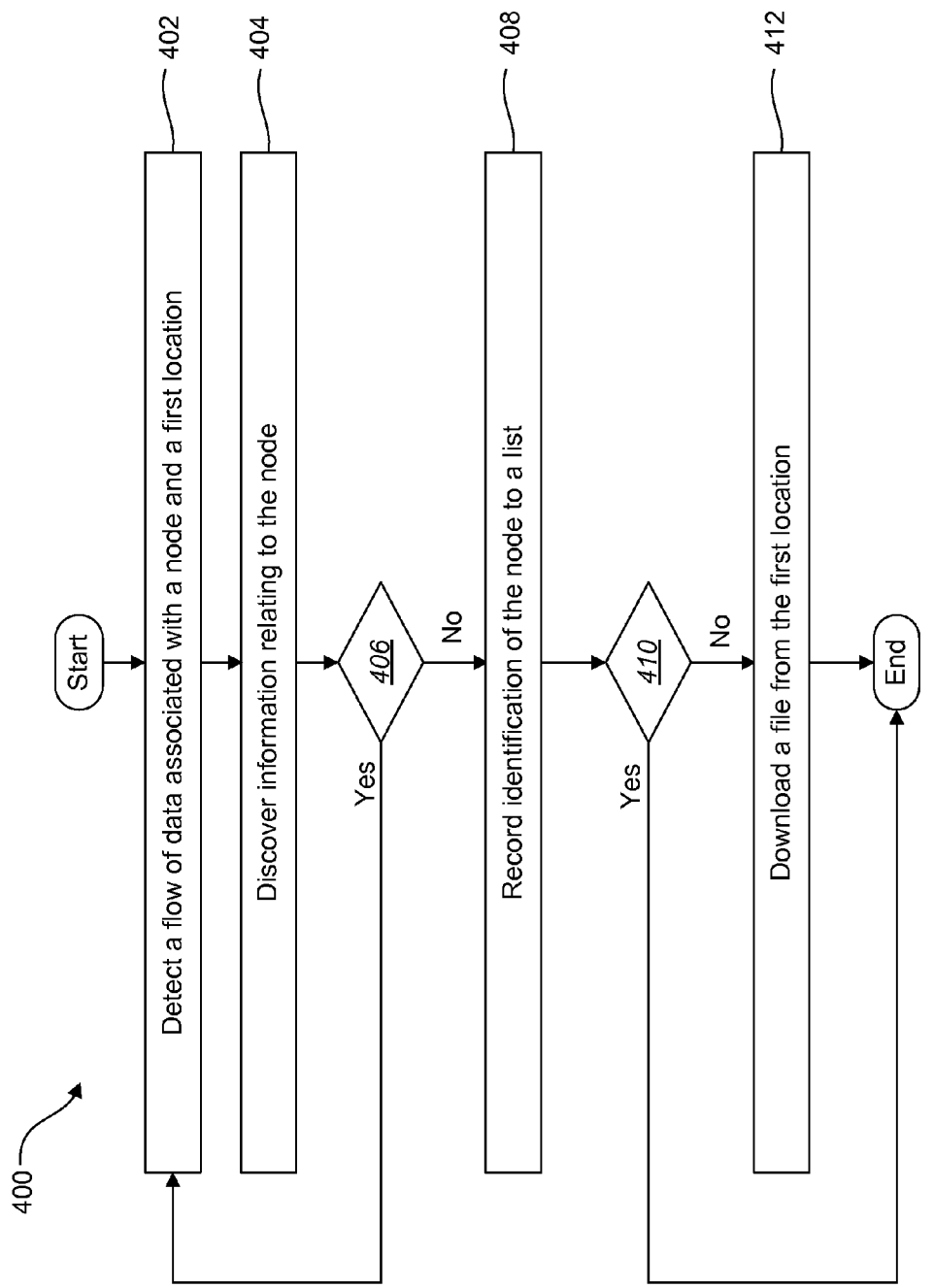
FIG. 4 is a flow diagram illustrating a method for detecting unmanaged nodes within a system.

FIG. 4 is a flow diagram illustrating a method 400 for detecting unmanaged nodes within a system. In one embodiment, the method 400 is implemented by a managed node 306. A flow of data may be detected 402. The flow of data may be associated with a node and a first location. The flow of data may include a DHCP broadcast (either a request or a reply). In addition, the flow of data may include an ARP request. Information relating to the node may be discovered 404. The information may include a hostname, IP address and MAC address of the node from which the DHCP broadcast originated, the node which receives the DHCP broadcast or the node from which the ARP request originated. The information that is discovered 404 may also include the status of the management agent 216 included within the node. In addition, discovering 404 the information may include building a filename based on the MAC address of the node and a known file path. The known file path may include the server 208.

A determination 406 is made as to whether the node associated with the flow of data is a unique node. For example, a determination 406 is made as to whether the node associated with the flow of data has been previously detected. In addition, it is determined 406 if a file associated with the previously built filename is included in the local cache 330 of the node. If it is determined 406 that the flow of data associated with the node has been previously detected, the method 400 returns to detecting 402 flows of data associated with nodes. However, if it is determined 406 that the node has not been previously detected, the identification and information relating to the node are recorded 408 on a list. Similarly, if it is determined 406 that the file is not stored in the local cache 330, discovery of the node has not previously taken place and the identification of the node is recorded 408 on the list.

A determination 410 is also made as to whether the file associated with the previously built filename is included in a local subnet. The may be accomplished by performing a peer aware download. If the peer aware download does not produce the file being stored on the local subnet, a device associated with the first location may be contacted and the file may be downloaded 412 from the device at the first location.

Figure 5:
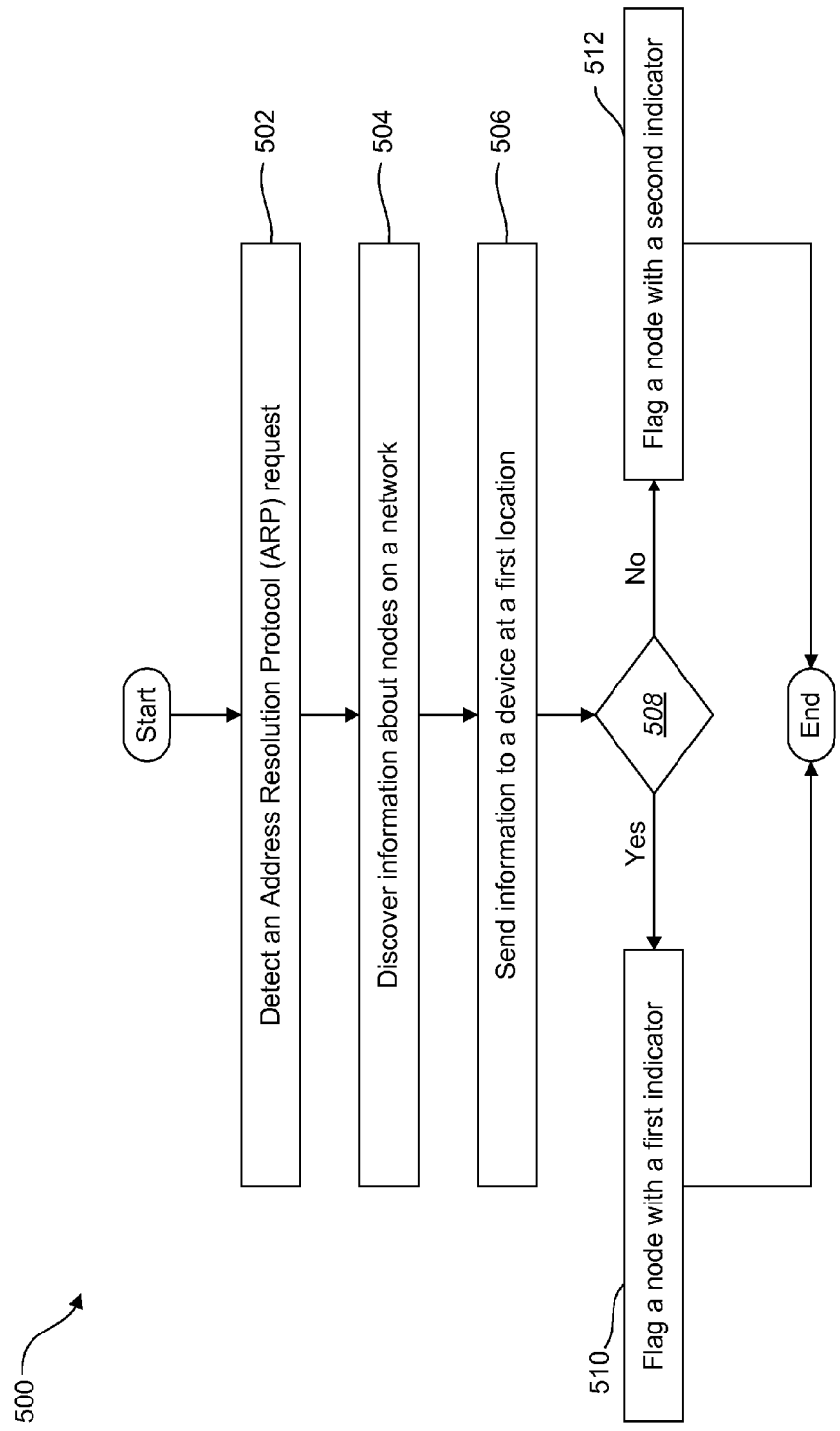
FIG. 5 is a flow diagram illustrating a method for discovering nodes with a disabled management agent.

FIG. 5 is a flow diagram illustrating a method 500 for discovering nodes with disabled management agents 216. An ARP request may be detected 502. ARP discovery may be used to discover 504 information about nodes on a network. The information may include the hostname, IP address, the status of the management agent and the MAC address of all nodes that are found via the ARP discovery process. The status of the management agent of a node may indicate that the management agent is disabled. Information relating to the discovered nodes may be sent 506 to a device at a first location. The device may include the server 208. A determination 508 is made as to whether the information about a node is included in the database 210. If it is determined 508 that the node's IP address, MAC address and hostname are not found in the database 210 and the management agent 216 of the node is disabled, the node is flagged 510 with a first indicator. The first indicator may indicate that the node is rogue. In other words, the node is an unmanaged node because the information is not included in the database 210. If it is determined 508 that the management agent 216 is disabled, but the node's hostname, IP address and MAC address are included in the database 210, the node is flagged 512 with a second indicator. The second indicator may simply indicate the node is a managed node that includes a disabled management agent 216. An administrator of an IT department may generate a report that includes each node as well as the associated indicator for that node. The administrator is able to be aware of each node that has the management agent 216 disabled.

Figure 6:
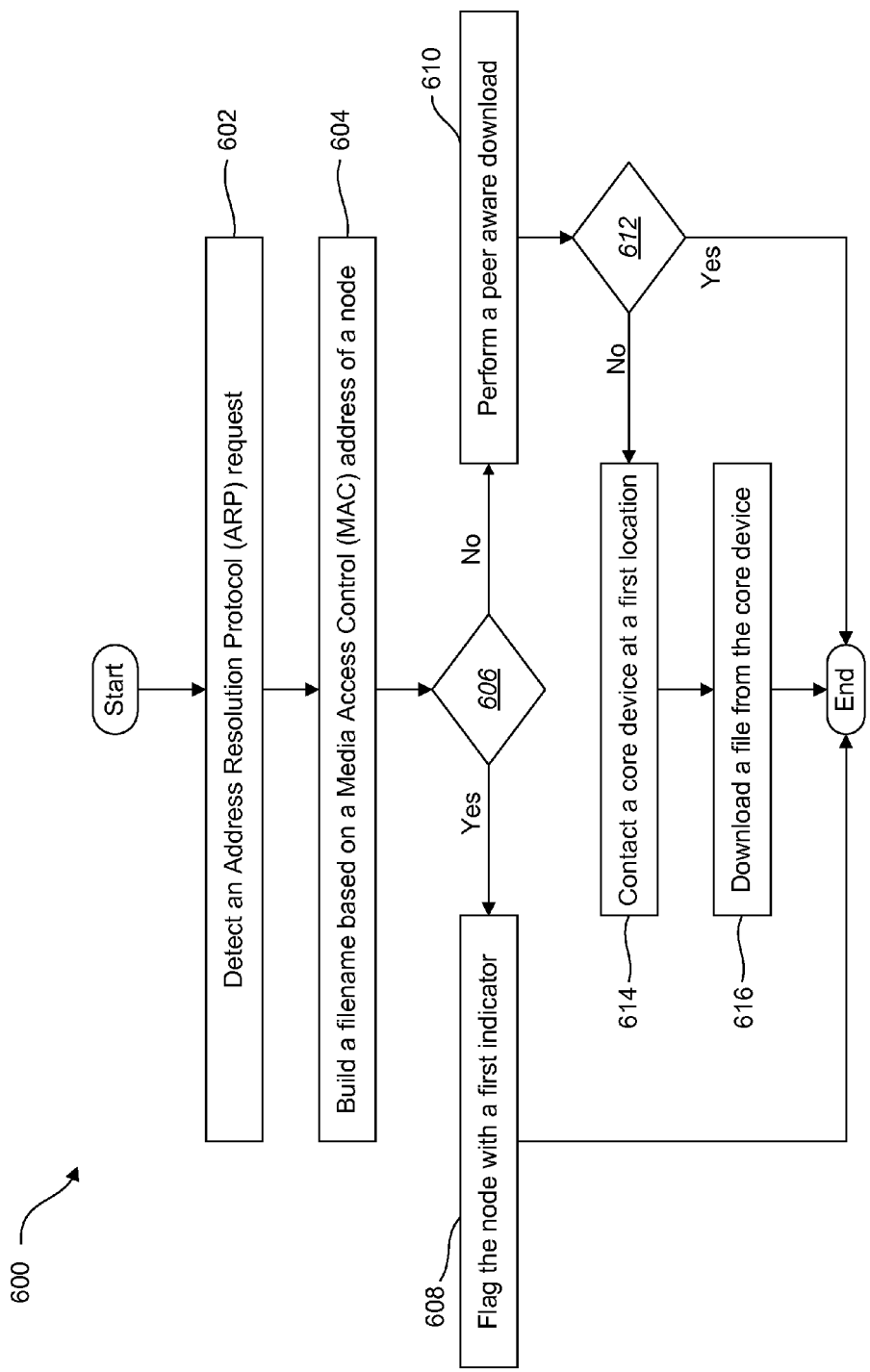
FIG. 6 is a flow diagram illustrating one embodiment of a method for discovering which assets are present in a network from Address Resolution Protocol (ARP) requests and subnet aware downloads.

FIG. 6 is a flow diagram illustrating one embodiment of a method 600 for discovering which assets are present in a network from ARP requests and subnet aware downloads. An ARP request may be detected 602 on the network. A filename may be built 604 based on a MAC address of a node and a well known path. For example, if a detected ARP request originated from a node with a MAC address of 00-12-3F-D7-35-02, the filename may be "http://coreserver/landeskcgi/arpdiscovery/00-12-3F-D7-02.cfg". A determination 606 is made as to whether the file indicated by the filename is stored in the local cache 330. In one embodiment, the local cache 330 is Targeted Multicast (TMC) cache.

If it is determined 606 that the file indicated by the filename is stored in the local cache 330, the node is flagged 608 with a first indicator. The first indicator may indicate that the node has already been discovered. If it is determined 606 that the file is not stored in the local cache 330, a peer aware download may be performed 610. A determination 612 may be made whether the file was found on a local subnet when the peer aware download was performed 610. If it is determined that the file was on the local subnet, the method 600 ends. However, if it is determined 612 that the file was not on the local subnet, a core device at a first location is contacted 614. In one embodiment, the core device may be the server 208. The file may be downloaded 616 from the core device.

In one embodiment, a system configured with a management agent 216 automatically creates and places the ARP discovery file in local TMC cache. In other words, in this particular embodiment, the only time the core device is contacted 614 would be when the node was not managed. Thus, if a request was received by the common gateway interface (CGI) on the core device from an ARP discovery file, the core device is aware that the node referenced by the filename is unmanaged. The core device may proceed to create an unmanaged node discovery record.

Figure 7:
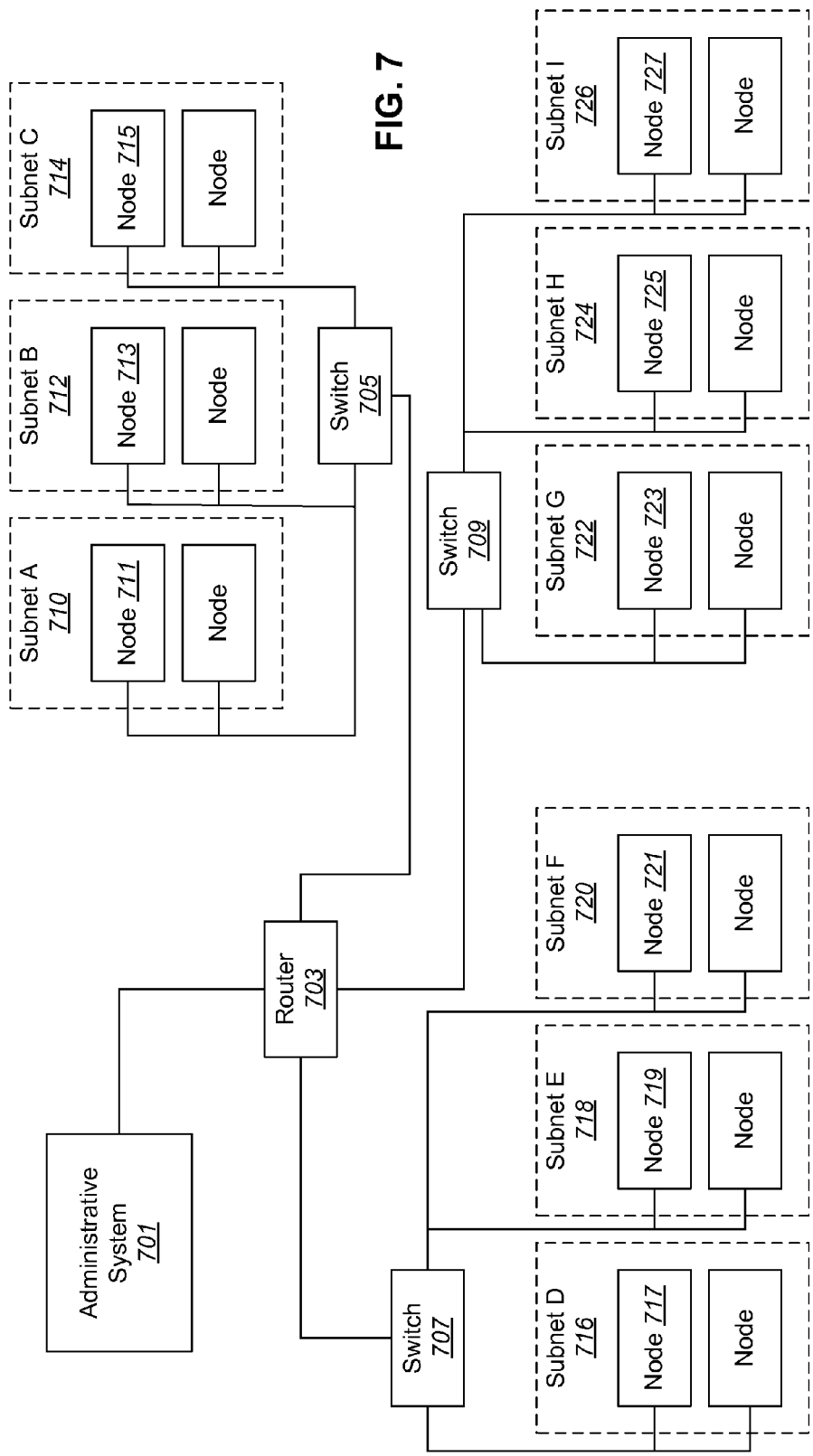
FIG. 7 is an exemplary block diagram illustrating a computer network on which the present systems and methods may be implemented.

FIG. 7 is an exemplary block diagram illustrating a computer network on which the present systems and methods may be implemented. In FIG. 7, an administrative system 701 connects to a router 703.

The router 703 may be connected to three switches: a first switch 705, a second switch 707 and a third switch 709. Each switch 705, 707, and 709 connects to three subnets. The first switch 705 connects to three subnets 710, 712, and 714. The second switch 707 connects to three subnets 716, 718, and 720. The third switch 709 connects to three subnets 722, 724, and 726. A network groups may be embodied in a wide variety of configurations and may include a local area network, a subnet 710, 712, and 714, or a group of subnets 710, 712, and 714. The network nodes or elements 711, 713, 715, 717, 719, 721, 723, 725 and 727 represent computer systems or devices on the computer network. One or more of the nodes may use embodiments of the systems and methods described herein. The network may include both wired and wireless connections to nodes or elements 711, 713, 715, 717, 719, 721, 723, 725 and 727 within the network.

Figure 8:
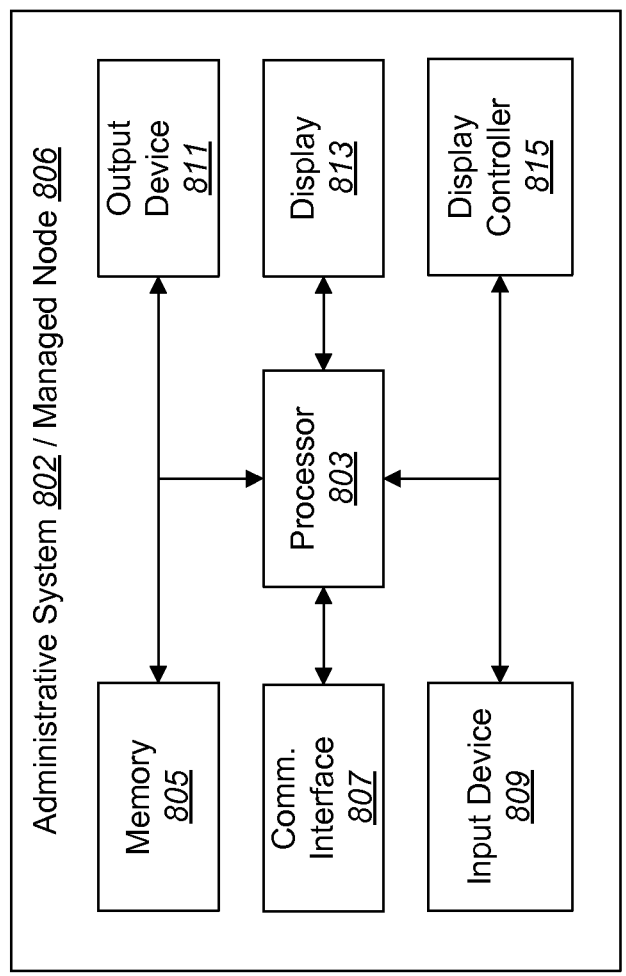
FIG. 8 is a block diagram illustrating the major hardware components typically utilized in an administrative system and/or a managed node.

FIG. 8 illustrates various components that may be utilized in an administrative system 802 and/or a managed node 806. The illustrated components may be located within the same physical structure or in separate housings or structures.

The administrative system 802 and/or managed node 806 includes a processor 803 and memory 805. The processor 803 controls the operation of the administrative system 802 and/or managed node 806 and may be embodied as a microprocessor, a microcontroller, a digital signal processor (DSP) or other device known in the art. The processor 803 typically performs logical and arithmetic operations based on program instructions stored within the memory 805.

The administrative system 802 and/or managed node 806 typically also includes one or more communication interfaces 807 for communicating with other electronic devices. The communication interfaces 807 may be based on wired communication technology, wireless communication technology, or both. Examples of different types of communication interfaces 807 include a serial port, a parallel port, a Universal Serial Bus (USB), an Ethernet adapter, an IEEE 1394 bus interface, a small computer system interface (SCSI) bus interface, an infrared (IR) communication port, a Bluetooth wireless communication adapter, and so forth.

The administrative system 802 and/or managed node 806 typically also includes one or more input devices 809 and one or more output devices 811. Examples of different kinds of input devices 809 include a keyboard, mouse, microphone, remote control device, button, joystick, trackball, touchpad, lightpen, etc. Examples of different kinds of output devices 811 include a speaker, printer, etc. One specific type of output device which is typically included in a computer system is a display device 813. Display devices 813 used with embodiments disclosed herein may utilize any suitable image projection technology, such as a cathode ray tube (CRT), liquid crystal display (LCD), light-emitting diode (LED), gas plasma, electroluminescence, or the like. A display controller 815 may also be provided, for converting data stored in the memory 805 into text, graphics, and/or moving images (as appropriate) shown on the display device 813.

Of course, FIG. 8 illustrates only one possible configuration of an administrative system 802 and/or managed node 806. Various other architectures and components may be utilized.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The methods disclosed herein comprise one or more steps or actions for achieving the described method. The method steps and/or actions may be interchanged with one another without departing from the scope of the present invention. In other words, unless a specific order of steps or actions is required for proper operation of the embodiment, the order and/or use of specific steps and/or actions may be modified without departing from the scope of the present invention.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

What is claimed is:

1. A method for detecting unmanaged nodes within a system, the method comprising:

detecting a flow of data associated with an unmanaged node, wherein a managed node detects the flow of data, wherein the managed node and the unmanaged node are downstream of a router, wherein the router blocks communications between a management device and the unmanaged node such that the management device is unaware of the unmanaged node;

discovering, by the managed node, information relating to the unmanaged node, wherein discovering information comprises building a filename based on a Media Access Control (MAC) address of the unmanaged node and a file path;

determining, by the managed node, whether the unmanaged node has been previously discovered, wherein the management device is unaware of the unmanaged node until after the unmanaged node has been discovered or identified;

recording, by the managed node, the identification of the unmanaged node to a list if it is determined the unmanaged node has not been previously discovered;

determining if a management agent included on the unmanaged node is disabled; and transmitting, by the managed node, the identification of the unmanaged node to the management device and if the unmanaged node includes a disabled management agent, wherein the transmission sent by the managed node to the management device is not blocked by the router, thereby making the management device aware of the unmanaged node.

2. The method of claim 1, wherein the flow of data comprises a Dynamic Host Configuration Protocol (DHCP) broadcast.

3. The method of claim 1, wherein the flow of data comprises an Address Resolution Protocol (ARP) request.

4. The method of claim 1, further comprising determining if a file associated with the filename is stored in local cache of the unmanaged node.

5. The method of claim 4, further comprising performing a peer aware download and determining if the file is included in a local subnet of the unmanaged node.

6. The method of claim 5, further comprising contacting a core device to download the file if it is determined that the file is not included in the local subnet of the unmanaged node.

7. The method of claim 6, wherein the core device identifies an undiscovered machine based on a Uniform Resource Locator (URL) of the file that is downloaded from the core device.

8. The method of claim 1, further comprising comparing information related with the unmanaged node with information stored in a database.

9. The method of claim 1, further comprising flagging the unmanaged node as an unmanaged node if information relating to the unmanaged node is not stored in a database.

10. The method of claim 1, wherein the information relating to the unmanaged node comprises a hostname, an Internet Protocol (IP) address, a MAC address and a status of a management agent.

11. A computer system that is configured to detect unmanaged nodes within a system, the computer system comprising:
a processor;
memory in electronic communication with the processor;
instructions stored in the memory, the instructions being executable to:
detect a flow of data associated with an unmanaged node, wherein the computer system detects the flow of data, wherein the computer system and the unmanaged node are downstream of a router, wherein the router blocks communications between a management device and the unmanaged node such that the management device is unaware of the unmanaged node;
discover, by the computer system, information relating to the unmanaged node, wherein discovering information comprises building a filename based on a Media Access Control (MAC) address of the unmanaged node and a file path;
determine, by the computer system, whether the unmanaged node has been previously discovered, wherein the management device is unaware of the unmanaged node until after the unmanaged node has been discovered or identified;
record, by the computer system, the identification of the unmanaged node to a list if it is determined the unmanaged node has not been previously discovered;
determine if a management agent included on the unmanaged node is disabled; and
transmit, by the computer system, the identification of the unmanaged node to the management device and if the unmanaged node includes a disabled management agent, wherein the transmission sent by the computer system to the management device is not blocked by the router, thereby making the management device aware of the unmanaged node.

12. The computer system of claim 11, wherein the flow of data comprises a Dynamic Host Configuration Protocol (DHCP) broadcast.

13. The computer system of claim 11, wherein the flow of data comprises an Address Resolution Protocol (ARP) request.

14. The computer system of claim 11, wherein the instructions are further executable to determine if a file associated with the filename is stored in local cache of the unmanaged node.

15. The computer system of claim 14, wherein the instructions are further executable to perform a peer aware download and determine if the file is included in a local subnet of the unmanaged node.

16. The computer system of claim 15, wherein the instructions are further executable to contact a core device to download the file if it is determined that the file is not included in the local subnet of the unmanaged node.

17. The computer system of claim 16, wherein the core device identifies an undiscovered machine based on a URL of the file that is downloaded from the core device.

18. A non-transitory computer-readable medium comprising executable instructions for detecting unmanaged nodes within a system, the instructions being executable to:
detect a flow of data associated with an unmanaged node, wherein a managed node detects the flow of data, wherein the managed node and the unmanaged node are downstream of a router, wherein the router blocks communications between a management device and the unmanaged node such that the management device is unaware of the unmanaged node;
discover, by the managed node, information relating to the unmanaged node, wherein discovering information comprises building a filename based on a Media Access Control (MAC) address of the unmanaged node and a file path;
determine, by the managed node, whether the unmanaged node has been previously discovered, wherein the management device is unaware of the unmanaged node until after the unmanaged node has been discovered or identified;
record, by the managed node, the identification of the unmanaged node to a list if it is determined the unmanaged node has not been previously discovered;
determine if a management agent included on the unmanaged node is disabled; and
transmit, by the managed node, the identification of the unmanaged node to the management device and if the unmanaged node includes a disabled management agent, wherein the transmission sent by the managed node to the management device is not blocked by the router, thereby making the management device aware of the unmanaged node.

* * * * *